(12) United States Patent
Choi et al.

(10) Patent No.: US 8,561,042 B2
(45) Date of Patent: Oct. 15, 2013

(54) SYSTEM AND METHOD FOR REDUCING EXECUTION TIME OF BYTECODE IN JAVA VIRTUAL MACHINE

(75) Inventors: Jung-pil Choi, Seongnam-si (KR); Hyo-jung Song, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1629 days.

(21) Appl. No.: 11/429,205

(22) Filed: May 8, 2006

(65) Prior Publication Data
US 2007/0006185 A1 Jan. 4, 2007

(30) Foreign Application Priority Data
May 19, 2005 (KR) .................. 10-2005-0042082

(51) Int. Cl.
*G06F 9/45* (2006.01)
(52) U.S. Cl.
USPC .......................................................... 717/151
(58) Field of Classification Search
USPC .......................................................... 717/151
See application file for complete search history.

(56) References Cited

U.S. PATENT DOCUMENTS

| | | | |
|---|---|---|---|
| 5,222,244 A | 6/1993 | Carbine et al. | |
| 5,737,624 A | 4/1998 | Garg et al. | |
| 5,974,531 A * | 10/1999 | Shang et al. | 712/202 |
| 6,026,485 A * | 2/2000 | O'Connor et al. | 712/226 |
| 2004/0205733 A1 | 10/2004 | Souloglou et al. | |

FOREIGN PATENT DOCUMENTS

| | | |
|---|---|---|
| JP | 2000-066901 A | 3/2000 |
| JP | 2000-267862 A | 9/2000 |
| JP | 2003-280894 A | 10/2003 |
| JP | 2004-133641 A | 4/2004 |
| KR | 10-2004-0034601 A | 4/2004 |

OTHER PUBLICATIONS

Barbara Ryder et al., "Experiments in Optimizing FP", Apr. 1988, IEEE Transactions on Software Engineering, vol. 14, No. 4, pp. 444-454.*
Rogers et al: "Exploiting Hardware Resources: Register Assignment across Method Boundaries" First Workshop on Hardware Support for Objects and Microarchitectures for Java, [Online] Oct. 10, 1999, pp. 1-5, XP002453326 Austin, Texas.
Kouya Shimura et al., "Experimental Development of Java JIT Compiler" Fujitsu Laboratories Ltd., San Microsystems, Inc. pp. 3-6.

* cited by examiner

*Primary Examiner* — Wei Zhen
*Assistant Examiner* — Lanny Ung
(74) *Attorney, Agent, or Firm* — Sughrue Mion, PLLC (57) ABSTRACT

A system and method for reducing the bytecode execution time in the Java virtual machine are disclosed. The system includes a DB cache to store old machine code converted from a bytecode, a machine code change unit to change the old machine code to new machine code by removing a predetermined instruction included therein, a register management unit to manage stack data necessary for operations of the new machine code and a register file to provide a register region to conduct the operations, and a machine code information storage unit to store basic block information on the new machine code and spill and fill execution information in the stack of the register file.

7 Claims, 6 Drawing Sheets

FIG.1 op(A0)     *//CASE BEGIN ILOAD_1 at Mem[A0]
         * LDR r1, [VM_lp, #4]
         * STR r1, [VM_sp, #4]!

op(A1)     *//CASE BEGIN ILOAD_2 at Mem[A1]
         * LDR r1, [VM_lp, #8]
         * STR r1, [VM_sp, #4]!

op(A2)     *//CASE BEGIN IADD at Mem[A2]
         * LDR   r2, [VM_sp, #-4]  ⎤ (A)
         * LDR   r1, [VM_sp, #-4]  ⎦
         * ADD r1, r2,r1     (B)
         * STR r1, [VM_sp, #4]!     (C)

op(A3)     *//CASE BEGIN ISTORD_3 at Mem[A3]
         * LDR r1, [VM_sp, #-4]
         * STR r1, [VM_lp, #12]

| | (11) | (12) | (13) | (14) | (15) | (16) |
|---|---|---|---|---|---|---|
| | MACHINE CODE ADDRESS | BBF | BBE | NO OF REGISTERS | Spill/Fill | STACK INFORMATION |
| | 0x3400 | 1 | 0 | 1 | Spill | 0 |
| | 0x3414 | 0 | 0 | 3 | Fill | 0 |
| | 0x342F | 0 | 1 | 0 | | +2 |
| ... | | | | | | |
| ... | | | | | | |

FIG. 4

FIG. 5 op(A0)  *//CASE BEGIN ILOAD_1 at Mem[A0]
         * LDR r2, [VM_lp, #4]

op(A1)  *//CASE BEGIN ILOAD_2 at Mem[A1]
         * LDR r3, [VM_lp, #8]

op(A2)  *//CASE BEGIN IADD at Mem[A2]
         * ADD r2, r3, r2 op(A3)  *//CASE BEGIN ISTORD_3 at Mem[A3]
         * STR r2, [VM_lp, #12]

SYSTEM AND METHOD FOR REDUCING EXECUTION TIME OF BYTECODE IN JAVA VIRTUAL MACHINE

CROSS-REFERENCE TO RELATED APPLICATIONS

This application claims priority from Korean Patent Application No. 10-2005-0042082 filed on May 19, 2005, in the Korean Intellectual Property Office, the disclosure of which is incorporated herein in its entirety by reference.

BACKGROUND OF THE INVENTION

1. Field of the Invention

Systems and methods consistent with the present invention relate to reduction of the execution time of bytecode in a Java virtual machine (JVM). More particularly, the present invention relates to a system and a method for reducing the bytecode execution time in the JVM, whereby the entire bytecode execution time can be reduced by keeping the number of accesses of a stack memory to a minimum when carrying out machine code operations.

2. Description of the Related Art

Java is an object-oriented programming language which has become the de facto standard in network programming. These days, Java is used in embedded systems and in systems including a microprocessor or a microcontroller. Characteristics of Java environments include object-orientation, automatic garbage collection and runtime security, and a part thereof can be successfully used in embedded applications.

However, the performance of the runtime environment has been poor because of the resource overhead required to execute Java code in the virtual machine of an interpreter or a just-in-time (JIT) compiler.

Java binary code, called "bytecode", is distributed in one or more class files. Bytecode is instructions of a hypothetical computer that was specially designed for the execution of Java programs.

Since the conventional CPU cannot execute bytecode, the bytecode is executed in a software layer called the Java virtual machine (JVM). The JVM is an abstract machine specification that was published by Sun Microsystems, Inc.

Execution of a Java program will now be described. A Java program, which has the ".java" extension, is compiled by a compiler and converted into a java executable file having the ".class" extension. The class file is interpreted by an interpreter and is executed. Interpreting is done in three stages: class loading to load all the classes necessary for execution of the program, verification to check the formats of the class files, licenses to access, and format changes of data, and actual execution of the program.

The hierarchical structure of Java comprises a Java program written in the Java language, the Java platform including the JVM and the Java application programming interface (API), and a hardware-dependent platform. Under this structure, a Java executable file is composed of bytecode, which is platform independent, and thus, it can run on any platform that has the Java runtime environment (JRE), independent of the hardware of the system.

Java technology has a number of advantages including platform independence, that is, secure Write Once Run Anywhere (WORA) capability and dynamic extensibility, and therefore, it is used in a variety of fields. Most web servers are based on Java technology since it has been actively used as a server technology for web services. Java technology is also being employed in embedded devices as an environment to provide user services or execute control applications.

Figure 1:
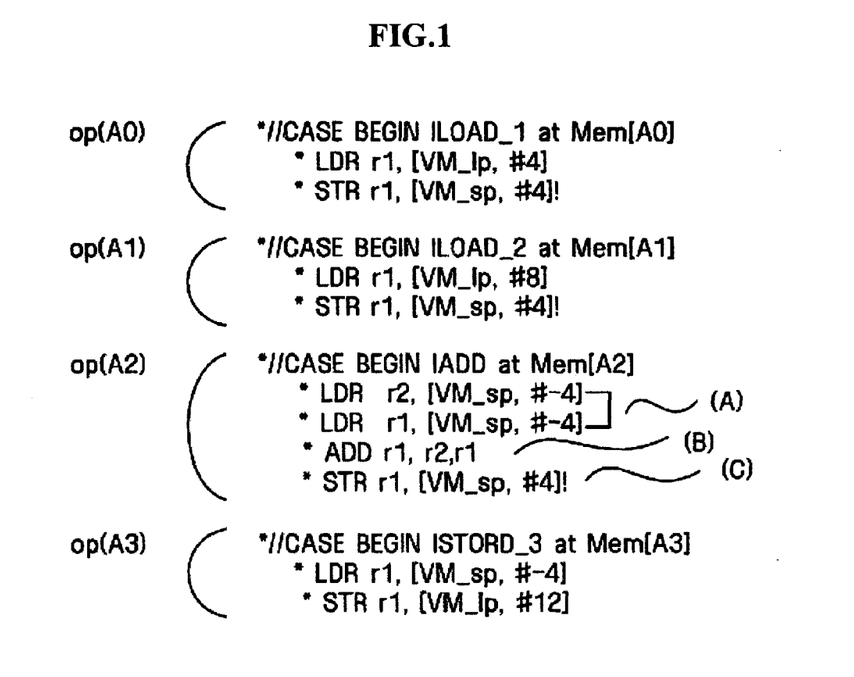
FIG. 1 illustrates processing instructions for carrying out operations of conventional machine code.

FIG. 1 illustrates instruction processing to conduct operations of a conventional machine code.

As illustrated, machine code having a start address op(A0) of a basic block executes an instruction to transfer data stored in the +4 position to a register 1 (r1) at the current local point (lp), and executes an instruction to store the data stored in the register 1 (r1) in the +4 position at the current position of the stack pointer (sp), and then changes the address of the stack pointer to the address by +4.

Machine code having op(A1) of the basic block address executes an instruction to transfer data stored in the +8 position to a register 1 at the current local point, and executes an instruction to store the data stored in register 1 in the +4 position of the stack pointer, and then changes the address of the stack pointer by +4.

Machine code having the basic block address of op(A2) executes an instruction to transfer data stored in the −4 position to a register 2 (r2) at the current stack point, and conducts an instruction to transfer the data stored in the −4 position to the register 1 at the current stack point (A). In addition, it executes an instruction to add the values in register 1 and register 2, and store the result in register 1 (B), and executes an instruction to store data stored in the register 1 at the current position of the stack pointer +4, and then changes the address of the stack pointer by +4 position (C).

Three types of machine instructions are present in the machine code: a pop (A), a push (C) and a core instruction (B). The pop instruction is to transfer data in an upper part of the stack to a register, the push instruction is to transfer data stored in the register to the stack, and the core instruction refers to all the other instructions. In the basic block, the instructions are in the sequence of pop, push and core. The pop instruction uses successive registers in descending order, i.e., Reg_k, Reg_(k−1), . . . , Reg_1. The push instruction uses successive registers in ascending order, i.e., Reg_1, . . . , Reg_p. The core instructions use the same registers that the pop and push instructions use.

The machine code having the basic block address of op(A3) executes an instruction to transfer data stored at the current position of the stack pointer −4 to register 1, and executes an instruction to store the data stored in register 1 at the current position of the stack pointer +12.

Accordingly, in order to execute blocks A0 to A3, ten instructions to load/store from/to the stack six times, and an instruction to load/store from/the the local point three times must be executed.

To reduce memory accesses in the Java environment, bytecode folding, database (DB) cache and stack registers have been used.

Bytecode folding refers to a method that patterns in advance three or four successive instructions that are frequently used when executing the bytecode, and when these patterns are detected, optimized machine code corresponding to the whole pattern is executed in lieu of executing every instruction. According to bytecode folding, an operation result belonging to a pattern is stored in a register and it can be directly utilized when another instruction belonging to the same pattern uses it, thereby being capable of reducing the number of stack accesses.

Typical operations of bytecode folding will now be described. Among bytecode to be executed, three or four successive instructions are searched and it is checked whether they are identical to the limited number of predetermined patterns. When identical patterns are searched for, provided machine code is executed in lieu of executing the instructions, and the positions of the instructions are changed. However, if the instructions to be executed are not identical to the predetermined patterns, each instruction is executed.

The bytecode folding may produce an improvement in performance because fewer instructions have to be executed, and the number of memory accesses is reduced. However, only predetermined patterns can be applied, and thus, the application scope is limited. Also, it is very effective in an application having bytecode use patterns that cannot be processed in a folding unit.

A DB cache is embodied within the Pico Java processor. A DB cache is a kind of instruction cache and is a region to store bytecode to be executed in the pipeline stage and machine code generated as a result of bytecode folding, both of which are input by the folding unit. The DB cache can reduce memory accesses as it acts as an instruction cache, and in particular, further folding may not be executed when the already folded bytecode is stored, thereby being capable of further improving the performance Operations of the DB cache will now be described. In a fetch stage, it is checked whether a corresponding instruction address is present in the DB cache. As a result, if no corresponding address is present, the process proceeds to the general pipeline execution, and at the same time the bytecode is sent to an instruction folding unit.

Then the instructions folding unit executes bytecode folding and sends the folding result or the instruction to the DB cache so it can be stored therein. If a corresponding instruction address is present in the patch stage, an instruction selected from the DB cache is executed.

When the bytecode is fetched from the DB cache in this way, memory accesses are reduced. When the folded machine code is fetched, memory accesses are reduced and the folding time is shortened.

The DB cache stores the bytecode and the machine code as the folding result in an additional cache in order to reduce memory accesses, and make further folding operations unnecessary. However, the process still retains the disadvantages described above.

A stack register realizes a stack by combining a round-shaped register and a memory with the limited number for a stack machine such as Java. In order to allow an execution unit to access the register when it needs to use the stack, the top region of the stack is filled and used in the register. When the register becomes filled, the bottom portion of the stack, which has been scarcely used, is dumped into the memory.

Typical operations of the stack register will now be described. The execution unit requests pop and push operations on the stack.

In case of a push operation, a value is added to the register. In case of a pop operation, a value is removed from the register, thereby creating an empty space in the register.

When the entire top of the stack is allocated by successive pushes, the bottom portion of the stack is not dumped into the memory, whereas the content dumped to the memory is transferred to the register when the top space of the stack is empty due to successive pops.

However, the stack register composes a stack using limited registers and memory, and it is assured that the execution unit can always use the registers, but not the memory thereby improving push and pop performance. However, it cannot remove push and pop instructions for an ineffective stack already present in the code.

SUMMARY OF THE INVENTION

Accordingly, the present invention has been proposed to solve the problems described above. An object of the present invention is to minimize accesses to a stack memory and reduce bytecode execution time by storing the upper portion of the stack memory required for carrying out operations of a machine code, in a stack register, and securing the register regions to conduct the operations.

Another object of the present invention is to provide a new machine code from which top-type and push-type instructions are removed, by storing stack data in the stack register.

The present invention shall not be limited to the objects described above. Any other objects not described herein shall be clearly understood by those skilled in the art from the descriptions stated below.

According to an aspect of the present invention, there is provided a system for reducing the bytecode execution time in the JVM, the system comprising a DB cache to store a plurality of machine code converted from a bytecode, a machine code change unit to change the machine code to new machine code by removing a predetermined instruction included therein, a register management unit to manage stack data necessary for operations of the machine code and a register file to provide a register region to conduct the operations, and a machine code information storage unit to store basic block information on the machine code and spill and fill execution information in the stack of the register file.

According to another aspect of the present invention, there is provided a method of reducing the bytecode execution time in the Java virtual machine, the method comprising converting bytecode into machine code and storing the bytecode, providing a register file that secures stack data necessary for conducting operations of the machine code, and a register to conduct the operations, changing the machine code into new machine code by removing a predetermined instruction from the machine code, and conducting operations of the changed machine code.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS

Hereinafter, exemplary embodiments of the present invention will be described in detail with reference to the accompanying drawings.

Aspects of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Figure 2:
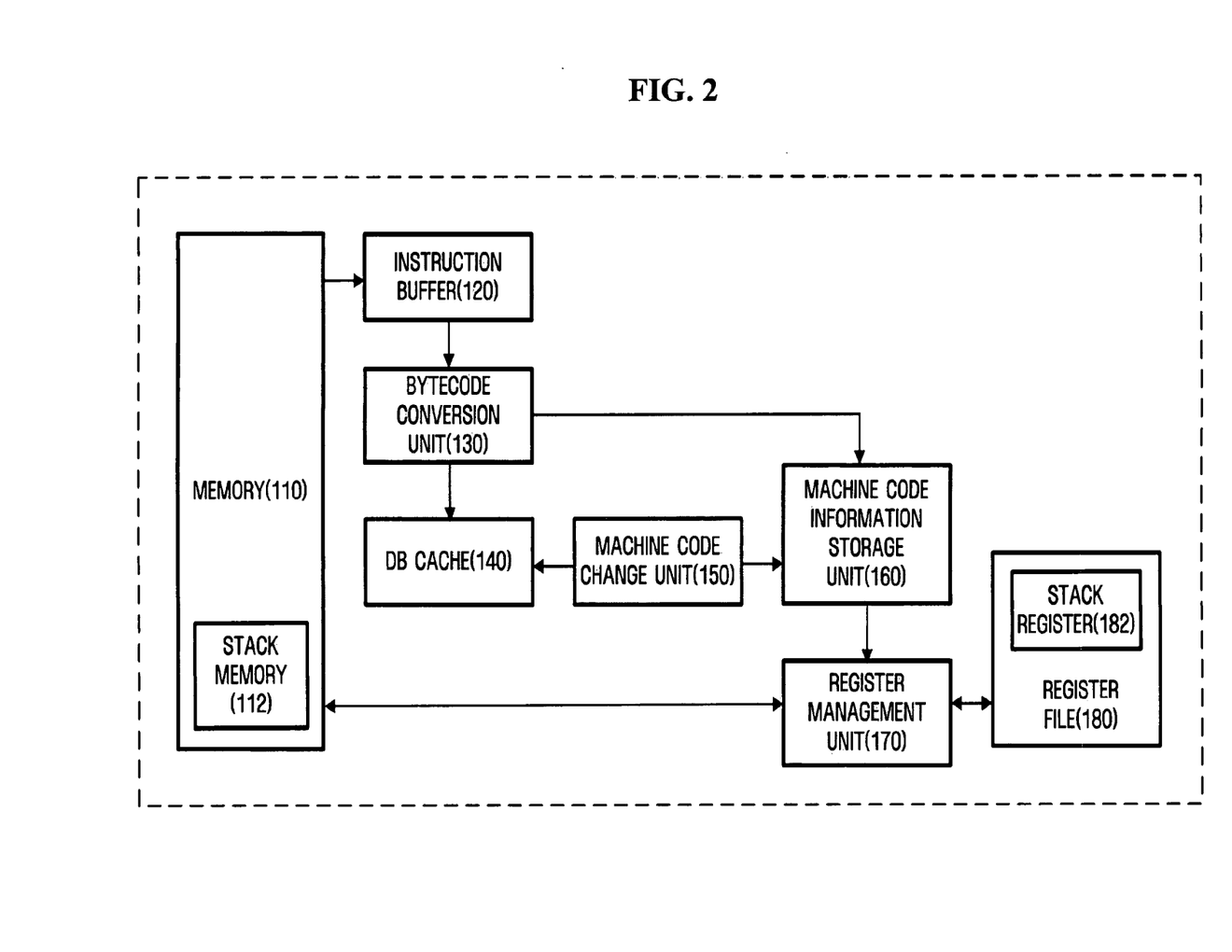
FIG. 2 is a block diagram illustrating the inside of a system to reduce bytecode execution time in a Java virtual machine according to an exemplary embodiment of the present invention.

FIG. 2 is a block diagram illustrating the inside of a system to reduce the bytecode execution time in a Java virtual machine according to an exemplary embodiment of the present invention.

As illustrated, the system comprises a memory 110, an instruction buffer 120, a bytecode conversion unit 130, a DB cache 140, a machine code change unit 150, a machine code information storage unit 160, a register management unit 170 and a register file 180. It should be noted that devices that can include the Java virtual machine include wired and wireless terminals, home appliances, embedded devices and others.

The memory 110 stores a stack region (i.e., stack memory 112) that is used in the Java virtual machine, and predetermined instructions.

The instruction buffer 120 temporarily stores instructions (e.g., bytecode) fetched from the memory 110. When an instruction to be executed is not stored in the DB cache 140, the instruction buffer 120 fetches it from the memory 110. At this time, the instruction buffer 120 also fetches the next instruction to be executed from the memory and stores it.

When the instruction fetched by the instruction buffer 120 is bytecode, the bytecode conversion unit 130 converts the instruction into machine code. Here, a single bytecode is converted into a plurality of machine code. The bytecode conversion unit 130 also analyzes the bytecode. When the converted machine codes constitute a start address and an end address of a basic block, the bytecode conversion unit 130 sends the address of a concerned machine code to the machine code information storage unit 160.

The DB cache 140 stores machine codes converted by the bytecode conversion unit 130.

When a machine code to carry out operations stored in the DB cache 140 corresponds to the start address of the basic block, the machine code change unit 150 changes the machine code included in the basic block to new machine code. That is, original machine code to carry out operations is changed to new machine code to reduce read/write instructions on the stack.

Change of machine code is executed on a basic block address basis. To change the machine code, the register file 180 should satisfy a condition for changing the machine code. As the machine code change condition, a register to carry out operations and stack data required for the operations must be present in the register file 180. The register management unit 170 executes spill or fill at the time of carrying out operations, in order that the register file 180 satisfies the machine code change condition.

The machine code change unit 150 checks the status of the register file 180 (i.e., the machine code change condition) before changing the machine code, and sends information as to whether to execute spill or fill to the machine code information storage unit 160 in order to satisfy the machine code change condition. Based on the information stored in the machine code information storage unit 160 (e.g., information as to whether to execute spill or fill), the register management unit 170 executes spill or fill.

The machine code information storage unit 160 stores information on the basic block (start address and end address) for machine code converted by the bytecode conversion unit 130 and information as to whether to execute spill or fill of the register file 180 sent from the machine code change unit 150. When the stack information (e.g., Stack Top (ST), Stack Bottom (SB) and Stack Height (SH)) is changed due to a change in the stack, the machine code information storage unit 160 also stores the new stack information. The ST refers to a pointer to a register where the top of the stack is stored, the SB refers to a pointer to a register where the bottom of the stack is stored, and the SH refers to the number of registers used as stack registers. The machine code information storage unit 160 stores in a table form information on machine code to carry out operations. The information table will be described in detail with reference to FIG. 3.

The register file 180 temporarily stores data, in which information sufficiently lengthy to carry out arithmetic/logic operations, information interpretation and transmission, and others are stored. For example, the stack register 182 to store the top of the stack memory 112 is included in the register file 180. In the exemplary embodiment of the present invention, the stack data stored in the stack register 182 is spilled to the memory 110 in order for the register file 180 to satisfy the machine code change condition, or the stack data stored in the memory 110 is filled. The stack register 182 of the register file 180 will be described in detail with reference to FIG. 4.

The register management unit 170 manages the stack register 182 of the register file 180. That is, spill or fill of the stack register 182 is executed in order to make it possible to change the machine code. Spill or fill execution information needed by the stack register 182 is stored in the machine code information storage unit 160.

When there is no register in the stack register 182 to execute operations (i.e., a push), when the machine code information change unit 150 intends to change predetermined machine code, a predetermined amount of stack data stored in the stack register 182 is sent to the stack memory 112 (i.e., a spill) to thereby create a register region to execute the operations. When stack data used in operations is not present in the stack register 182 (i.e., a pop), concerned stack data may be filled from the stack memory 112.

The register management unit 170 stores stack information (e.g., the ST, SB and SH) to manage the stack register 182. The stack information is changed by executing spill and fill for the stack register 182, and the stack management unit 170 stores and manages the new stack information.

Figure 3:
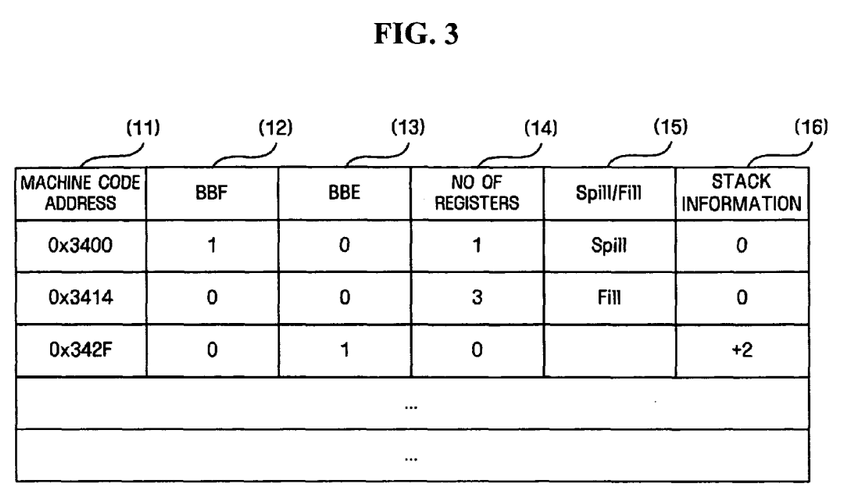
FIG. 3 illustrates an information table of a machine code information storage unit in the system to reduce bytecode execution time in a Java virtual machine according to another exemplary embodiment of the present invention.

FIG. 3 illustrates an information table of a machine code information storage unit 160 in the system to reduce bytecode execution time in the JVM according to another exemplary embodiment of the present invention.

As illustrated, the information table stores machine code addresses 11, basic block first (BBF) addresses 12, basic block end (BBE) addresses 13, the number of necessary registers 14, information on whether to spill or fill 15, and new stack information 16.

For example, machine code having an address of 0×3400 has the basic block first address 1 and one register. To carry out operations in the stack register, a spill must be executed. As a result of the spill, it can be seen that there is no change in the stack.

Accordingly, based on the information stored in the machine code storage unit 160, the register management unit 170 decides to conduct a spill and fill for the stack register

182. When the stack register meets the machine code change condition, the machine code change unit 150 conducts code change directed to the original machine code.

Figure 4:
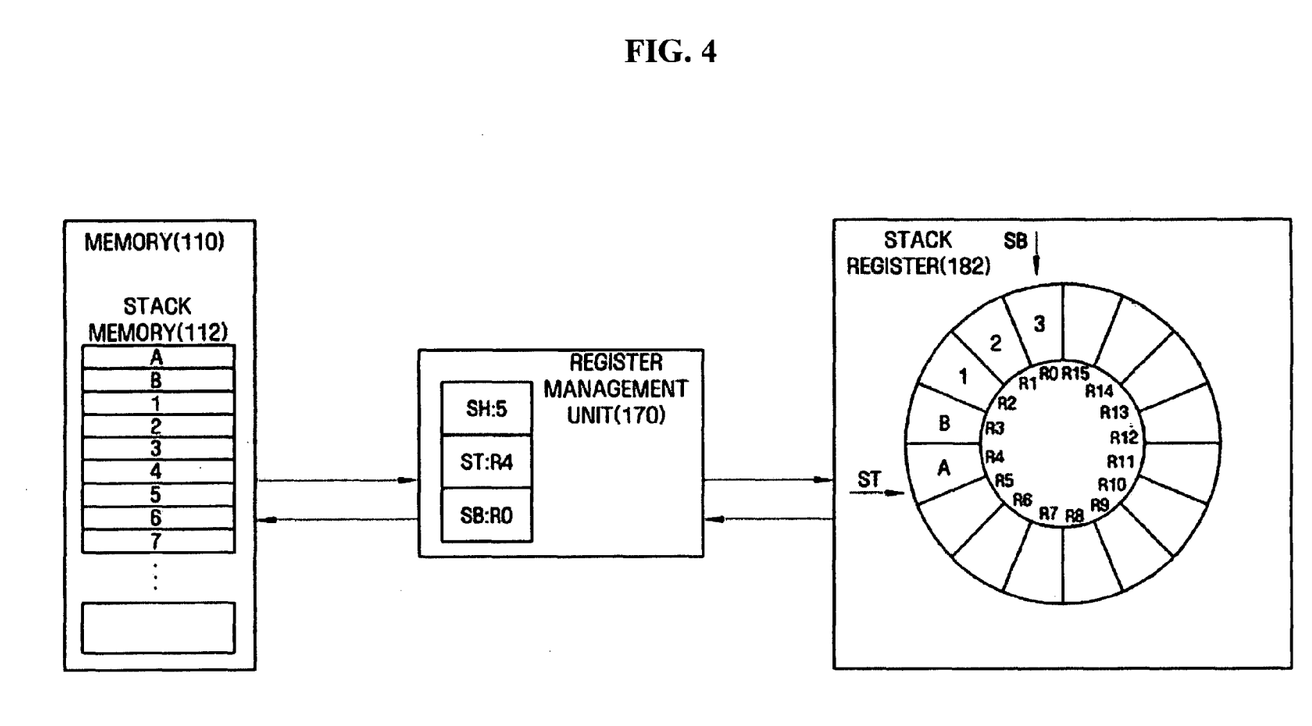
FIG. 4 illustrates execution of a spill and fill register management unit in the system to reduce bytecode execution time in a Java virtual machine according to another exemplary embodiment of the present invention.

FIG. 4 illustrates execution of spill and fill by a register management unit 170 in the system to reduce bytecode execution time in a Java virtual machine according to another exemplary embodiment of the present invention.

As illustrated, a plurality of stack data is stored in the stack memory 112, and five sets of data are registered in the stack register 182. The stack register 182 has a circular shape, and the ST and SB are indicated.

If the register management unit 170 executes a fill based on the information stored in the machine code information storage unit 160, the stack data at the top of the stack memory 112 is spilled, and then filled in the bottom portion of the stack register 182 in order to store the stack data necessary for operations in the stack register 182.

When the register management unit 170 executes the fill by 3, the SB position is moved to R13 from R0, and data values of 4, 5 and 6 are filled in R15 to R13 from the stack.

When the register management unit 170 executes the spill based on the information stored in the machine code information storage unit 160, a predetermined amount of stack data is spilled to the stack memory 112 in order to form a register region to carry out operations. Accordingly, the register region to carry out operations is secured in the stack register 182, and the pointer value of the SB decreases by the number sets of stack data spilled to the stack memory 112.

Figure 5:
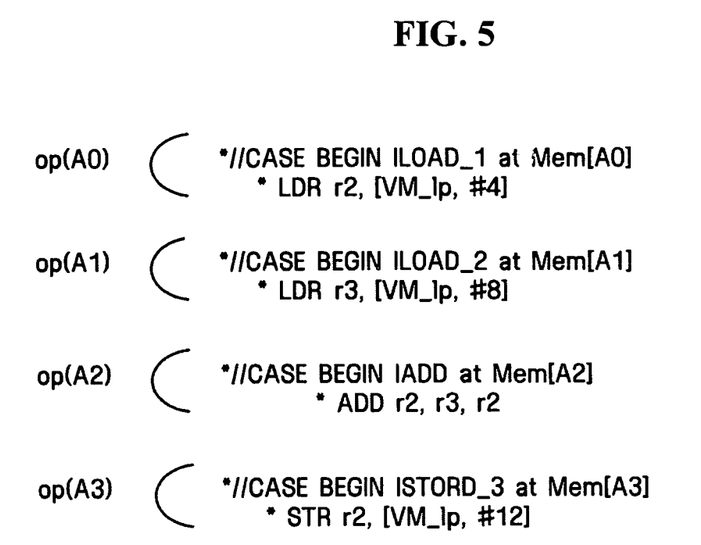
FIG. 5 illustrates the conversion of machine code by a machine code conversion unit in the system to reduce bytecode execution time in a Java virtual machine according to a further exemplary embodiment of the present invention.

FIG. 5 illustrates conversion of a machine code by a machine code change unit 150 in the system to reduce bytecode execution time in a JVM according to a further exemplary embodiment of the present invention. To conduct the machine code change, the stack register 182 comprises stack data necessary for the operations, and is allocated a register to carry out the operations.

As illustrated, the machine code having the basic block start address op(A0) performs an instruction to spill the data stored at the current position of the stack pointer +4 to register 2.

The machine code having the basic block address of op(A1) performs an instruction to spill the data stored at position 8 to the register 3.

The machine code having the basic block address of op(A2) performs an instruction to spill the result of carrying out operations for register 3 and register 2 to register 2.

The machine code having the basic block address of op(A3) conducts instructions to fill the data stored at the position +12 in register 2.

Since the new machine code does not conduct pop instructions and push instructions, a smaller number of instructions than those for conducting operations of the conventional machine code are carried out. Accordingly, in order to conduct the instructions in blocks A0 to A3, it is sufficient to conduct an instruction to load/store three times.

When the top of the stack is allocated to the stack register 182, unnecessary instructions are removed, thereby reducing stack accesses as much as possible.

Figure 6:
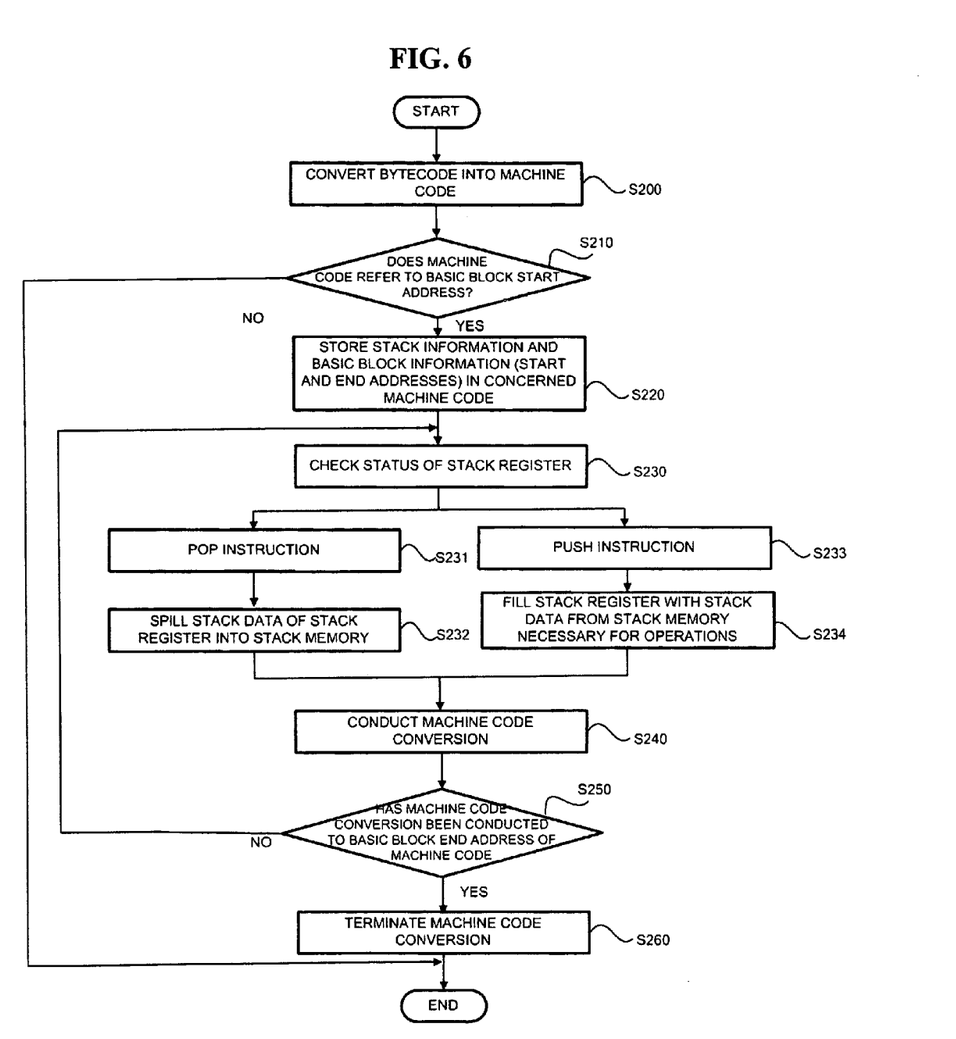
FIG. 6 is a flow chart illustrating a method of reducing the bytecode execution time in a Java virtual machine according to a further exemplary embodiment of the present invention.

FIG. 6 is a flow chart illustrating a method of reducing the bytecode execution time in the JVM according to a further exemplary embodiment of the present invention.

As illustrated, when an instruction fetched from the memory 110 is bytecode, the bytecode conversion unit 130 converts the concerned bytecode into the original machine code in operation S200, and stores the machine code in the DB cache 140.

Then, the machine code change unit 150 determines whether the original machine code to conduct an instruction stored in the DB cache corresponds to the basic block start address in operation S210. As a result of the determination, the original machine code to be conducted is the basic block start address, and the stack information on the concerned original machine code (ST, SB and SH), and basic block information (start address and end address) are stored in the machine code information storage unit 160 in operation S220.

The register management unit 170 checks the status of the stack register 182 based on the information on the machine code stored in the machine code information storage unit 160 in operation S230. It should be noted that the status of the stack register 182 may refer to the pop instructions to spill data stored in the stack register 182 to the stack memory 112, or the push instructions to fill data stored in the stack memory 112 in the stack register 182.

As a result of checking the status of the stack register 182, since the status of the stack register 182 is the push instructions, that is, the stack data necessary for operations is not included in the stack register, the register management unit 170 fills the stack data in the stack memory 112 into the stack register 182 in operation S234.

Then, the machine code change unit 150 changes the original machine code to new machine code that can conduct operations using the stack data stored in the stack register 182 without accessing the stack memory 112 in operation S240.

When the code change (up to the basic block end address) is completed, the machine code conversion is finished in operation S260. When the code change up to the basic block end address of the machine code is not completed, operations S230 and S240 are continuously conducted until the code is completed.

Accordingly, the top of the stack is allocated to the stack register 182, thereby forming a register region to carry out operations, and the total bytecode execution time can be reduced by reducing stack accesses.

The overhead to access the stack memory can be minimized by changing the machine code.

As described above, the system and the method for reducing the bytecode execution time in the Java virtual machine according to the exemplary embodiments of the present invention may produce one or more of the effects described below.

First, the top portion of the stack, which is necessary for conducting machine code operations, is stored in the stack register, to thereby secure a register region to conduct operations, whereby the entire bytecode execution time is reduced owing to minimized stack accesses.

Second, by storing the stack data in the stack register, the entire bytecode execution time can be reduced by providing new machine code from which pop and push instructions have been removed.

Third, the overhead to access to the stack using the new machine code is reduced to a minimum.

Exemplary embodiments of the present invention have been described with respect to the accompanying drawings. However, it should be understood by those of ordinary skill in the art that various replacements, modifications and changes in the form and details may be made therein without departing from the spirit and scope of the present invention as defined by the following claims. Therefore, it is to be appreciated that the above described exemplary embodiments are for purposes of illustration only and are not to be construed as a limitation of the invention.

What is claimed is:

1. A system which reduces the bytecode execution time in a Java virtual machine, the system comprising:

a database (DB) cache which stores old machine code converted from a bytecode;

a machine code change unit which changes the old machine code to new machine code by removing a predetermined instruction included therein, and checks a status of a register file based on information on the old machine code;

a register management unit which manages stack data for operations of the new machine code and the register file to provide a register region to conduct the operations based on the result of checking the status of the register file; and a machine code information storage unit which stores basic block information on the new machine code and spill and fill execution information in a stack of the register file, wherein the predetermined instruction removed by the machine code change unit is a pop or a push machine code instruction, wherein operations are conducted on the new machine code using only stack data stored in the register file without accessing a memory;

wherein the bytecode is retrieved from a memory used in the Java virtual machine;

wherein an upper portion of a stack region of the memory is stored into the stack of the register file, and wherein the old machine code is changed by executing a spill or fill operation of the stack of the register file.

2. The system of claim 1, wherein the register management unit fills stack data for operations of the new machine code in a register file based on the spill and fill execution information stored in the machine code information storage unit, and spills the stack data of the register file to thereby secure a register region to conduct the operations.

3. The system of claim 1, wherein the machine code change unit refers to the old machine code to conduct a machine code change when the old machine code stored in the DB cache is a basic block start address.

4. A method of reducing the bytecode execution time in a Java virtual machine, the method comprising:
   (a) converting bytecode into old machine code and storing the converted old machine code;
   (b) checking a status of a register file based on information on the old machine code;
   (c) providing the register file that secures stack data necessary for conducting operations of new machine code, and a register to conduct the operations based on the result of checking the status of the register file;
   (d) changing the old machine code into the new machine code by removing a pop or a push machine code instruction from the old machine code; and
   (e) conducting operations of the new machine code using only the stack data stored in the register file without accessing a memory,
   wherein prior to step (a), the bytecode is retrieved from the memory used in the Java virtual machine, and the method further comprising: storing an upper portion of a stack region of the memory into the register file, and
   wherein the old machine code is changed by executing a spill or fill operation of the register file.

5. The method of claim 4, wherein in step (b), fill, to receive stack data necessary for carrying out operations of the new machine code, and spill, to secure a register to conduct operations of the new machine code are conducted.

6. The method of claim 4, further comprising referring to the old machine code to conduct a machine code change when the stored old machine code is a basic block start address.

7. The method of claim 4, further comprising changing the old machine code when the basic block address of the old machine code is the start address.

* * * * *